(12) United States Patent
Hel et al.

(10) Patent No.: US 8,577,559 B2
(45) Date of Patent: Nov. 5, 2013

(54) DRIVE ARRANGEMENT AND PROCESS FOR THE DRIVE OF AN AGRICULTURAL IMPLEMENT

(75) Inventors: Sébastien Hel, Gray (FR); Stéphane Biziorek, Gray la ville (FR)

(73) Assignee: Deere & Company, Moline, IL (US)

(*) Notice: Subject to any disclaimer, the term of this patent is extended or adjusted under 35 U.S.C. 154(b) by 1046 days.

(21) Appl. No.: 12/536,864

(22) Filed: Aug. 6, 2009

(65) Prior Publication Data

US 2010/0036569 A1 Feb. 11, 2010

(30) Foreign Application Priority Data

Aug. 7, 2008 (DE) .................. 10 2008 041 075

(51) Int. Cl.
  *G06F 7/70* (2006.01)
(52) U.S. Cl.
  USPC ........................................................ 701/50
(58) Field of Classification Search
  USPC ........... 56/10.2 A–10.2 G, 10.2 R, 10.3, 10.6,
    56/10.8, 11.3, 11.4, 11.5; 460/1–3, 6, 59,
    460/119, 149; 464/17, 42–48; 192/113.1,
    192/113.31, 56.5, 56.61, 56.56, 89.22,
    192/56.1; 701/50
  See application file for complete search history.

(56) References Cited

U.S. PATENT DOCUMENTS

| | | | |
|---|---|---|---|
| RE30,539 E | * | 3/1981 | van der Lely ................. 111/118 |
| 4,566,570 A | * | 1/1986 | Geisthoff ........................ 464/37 |
| 6,447,397 B1 | * | 9/2002 | Jaeger et al. .................... 464/37 |
| 6,699,130 B2 | * | 3/2004 | Wubbels ......................... 464/17 |
| 7,739,861 B2 | * | 6/2010 | Mackin ....................... 56/10.2 G |

FOREIGN PATENT DOCUMENTS

| | | |
|---|---|---|
| DE | 34 34 825 | 3/1986 |
| DE | 295 04 531 | 3/1995 |
| DE | 195 38 370 | 2/1996 |
| DE | 199 32 272 | 1/2001 |
| DE | 101 45 588 | 4/2003 |
| DE | 10145588 | 4/2003 |
| DE | 102005029405 | 1/2007 |
| DE | 10 2005 029 405 | 11/2007 |
| EP | 0175916 | 4/1986 |
| EP | 0 316 506 | 7/1991 |
| EP | 1344443 | 9/2003 |

OTHER PUBLICATIONS

European Search Report, Mar. 19, 2010, 4 Pages.

* cited by examiner

*Primary Examiner* — Robert Pezzuto

(57) ABSTRACT

A drive arrangement for the drive of an agricultural implement is provided that includes a drive engine that can be brought into a drive connection over a separable power take-off shaft clutch with a power take-off shaft output. A drive line of the operating implement is connected with the power take-off shaft output, with an overload clutch, and a control arrangement. The control arrangement is connected to a sensor arranged for the detection of the torque at the power take-off shaft output and, in normal operation, permits an actuator to disengage the power take-off shaft clutch as soon as the torque detected by the sensor reaches or exceeds a first threshold value, that corresponds to a torque that is smaller than the cut-off torque of the overload clutch. Immediately following, the control arrangement orders the actuator to engage the power take-off shaft clutch and when the power take-off shaft clutch is disengaged permits a torque at the power take-off shaft output that is greater than the cut-off torque of the overload clutch.

20 Claims, 3 Drawing Sheets

DRIVE ARRANGEMENT AND PROCESS FOR THE DRIVE OF AN AGRICULTURAL IMPLEMENT

FIELD OF THE INVENTION

The invention concerns an arrangement and process for the drive of an agricultural implement. The drive includes a drive engine, that is connected so as to drive a separable power take-off shaft output over a power take-off shaft clutch. A drive line of the operating implement is connected to the power take-off shaft output that includes an overload clutch that interrupts the drive line when a cut-off torque is exceeded. A control arrangement is connected to a sensor arranged to detect the torque at the power take-off shaft output, that is arranged to operate an actuator to disengage the power take-off shaft clutch as soon as the torque detected by the sensor reaches or exceeds a predetermined threshold value.

BACKGROUND OF THE INVENTION

In agricultural operating implements there is the danger that damage to the drive line or to driven components can occur due to overloads. For example, in the case of balers or towed forage harvesters, a blockage or stoppage of the elements that take up or convey the harvested crop, which in turn can overload the drive line. Other examples are rotating ground breaking implements that become overloaded at excessive operating depths or heavy ground conditions, or mowing implements, that are stalled by excessively heavy plant components. Therefore it is usual practice to provide operating implements with overload clutches that separate the drive line in case a turn-off torque is exceeded. For this purpose reference is made to the state of the art according to DE 295 04 531 U1 and DE 195 38 370 C1.

Furthermore, the towing or carrier vehicle that moves the agricultural implements across the field, typically includes a drive engine, that is connected over a separable power take-off shaft clutch to a power take-off shaft output for the connection to the drive line of the operating implement and is usually equipped with a sensor for the detection of the torque at the output of the power take-off shaft, that is in turn connected to a control arrangement, that disengages the power take-off shaft clutch, in order to prevent damage to the power take-off shaft drive line (see DE 101 45 588 A1). In the case of such arrangements, the cut-off torque may also depend upon the operating implement and its operating condition (DE 34 34 825 A1).

As a rule, the overload clutch of the operating implement shuts off at torques that do not yet lead to a cut-off of the power take-off shaft clutch. The operator of the carrier vehicle or towing vehicle then has no other option than to remove the cause of the overload manually, that is, for example, in the case of a harvesting machine (baler or forage harvester) to climb out of the cab, to remove the obstruction of the elements used to take up or convey away the harvested crop and then to return to the cab, in order to continue the harvesting operation, since the cause of the overload (that is the blockage in the case of the harvesting machine) still exists after re-engaging the power take of shaft clutch again (unless it had been removed previously) and this leads to the fact that the overload clutch continues to be disengaged. The process described here is time consuming, inconvenient and uncomfortable.

To overcome this disadvantage DE 199 32 272 A1 proposes that operating elements of a baler be driven by means of safety clutches whose cut-off torque can be increased by an increase of the operating pressure. If a load peak has been detected by a rotational speed sensor at a safety clutch, its operating pressure is automatically increased briefly to overcome the load peak. If this increase results in a removal of the cause of the load peak, the normal operation is again resumed, on the other hand, the operating pressure of the safety clutch can be increased further and further measures are taken to reduce the cause of the overload such as by increasing the flow capacity of the conveying channels. The disadvantage here is seen in the relatively high cost of the safety clutches with their variable cut-off torque.

SUMMARY OF THE INVENTION

The problem underlying the invention is seen in the need to provide a drive arrangement and a process for the drive of an agricultural implement that makes it possible by simple means to remove the cause of an overload of driven elements of the operating implement.

A drive arrangement includes a drive engine, that may be an internal combustion engine or an electric motor that can be connected to a power take-off shaft output over a separable power take-off shaft clutch. The operating implement is or can be provided with a drive line and contains an overload clutch that disengages when a cut-off torque is reached. An electronic control arrangement is connected to an actuator for the power take-off shaft clutch and a sensor that detects the torque at the power take-off shaft output. During normal operation the control arrangement compares the measured value of the sensor with a first threshold value that corresponds to a torque that is lower than the cut-off torque of the overload clutch. As soon as the measured value of the sensor exceeds the first threshold value, the control arrangement instructs the actuator to disengage the power take-off shaft clutch in order to cut-off the drive line of the operating implement so as to protect the latter from overload. Following this the control arrangement brings about a renewed disengagement of the power take-off shaft clutch and thereby makes possible a torque at the power take-off shaft output that is greater than the cut-off torque of the overload clutch.

In this way the cut-off of the power take-off shaft occurs at a torque at which the overload clutch of the drive line of the operating implement has not yet responded. Accordingly the driven elements of the operating implement are not yet overloaded during the cut-off of the power take-off shaft output that would cut-off the overload clutch. The second attempt at the removal of the cause of the overload, for example of a jam of the elements of the harvested crop take up arrangement for the take up of the harvested crop, is performed at a higher attainable torque than in the normal operation, which is also greater than the cut-off torque of the overload clutch. During the subsequent return to operation of the power take-off shaft output the cause of the overload can therefore usually be reduced by the driven elements of the operating implements. Thereby, an effective security of the drive line of operating implements is attained by simple means and the cause of a possible overload can be removed.

The control arrangement can therefore automatically provide the return of the power take-off shaft clutch after the first threshold value is exceeded and disengagement of the power take-off shaft clutch, or await an input from an operator into an appropriate input arrangement. Analogously, the higher allowable torque (that may be limited or unlimited in the upward direction) can be automatically selected by the control arrangement after the first threshold value is exceeded and a disengagement of the power take-off shaft clutch resulting therefrom or resulting from an input from an operator into an appropriate input arrangement.

Preferably the control arrangement compares the measured value of the sensor after a first threshold value is exceeded and a resulting disengagement of the power take-off shaft clutch with a second threshold value that corresponds to a torque that is greater than the cut-off torque of the overload clutch, and then cuts off the power take-off shaft clutch only if the measured value of the sensor is equal to or larger than the second threshold value. The second threshold value may be dimensioned in such a way that only the power take-off drive up to the power take-off output is protected, or it conforms to the operating implement.

In the case of a preferred embodiment, the first threshold value depends upon the operating condition of the operating implement about which the control arrangement is supplied with information. Thereby the fact can be recognized that some elements not driven or driven by the power take-off shaft output are driven elements of the operating implement that can be brought into various positions, can be turned off or can be operated at various speeds, and affect the torque required for the drive of the operating implement. An example of this is the cutting arrangement of a baler which leads to a higher torque requirement. If the element is in an operating condition that results in a lower drive torque of the entire operating implement, then the first threshold value is also appropriately reduced relative to another operating condition that would require a higher operating torque. Thereby the first threshold value can automatically be made to conform to the components of the operating implement that must be protected.

The torque detected by the sensor can also be used to limit or to control the forward operating speed of a carrier vehicle or support vehicle connected to the operating implement. The forward operating speed is controlled automatically by the control arrangement and is brought or limited automatically to a value, at which the torque detected by the sensor corresponds to a target value that is smaller than the first threshold value. Such a limitation or control is useful, for example, in the case of balers whose knives are positioned in the intake channel. If the knives are located outside the intake channel, preferably only the above described limitation of the torque of the power take-off shaft occurs, but no control or limitation of the forward operating speed. However, in the case of another configuration of knives positioned outside the intake channel a control or limitation of the forward operating speed is also possible.

In case that the measured value of the sensor reaches or exceeds the first threshold value and the power take-off shaft clutch is disengaged by the actuator, an obvious solution is to automatically stop a carrier vehicle or a towing vehicle connected to and carrying or towing the operating implement. The result thereby is that the operating implement also is stopped and that the field laying ahead of it is not worked upon.

The present invention is appropriate for any desired operating implement, such as balers for rectangular or circular bales with fixed or variable size of bale, attached or towed forage harvesters, ground breaking implements, mowers and the like. The drive engine may be located on a carrier vehicle or a towing vehicle, which in particular may be a tractor, which carries or tows the operating implement, or is located on a self propelled operating vehicle, for example, a self-propelled harvesting machine, such as a forage harvester, cotton harvester, combine or a self propelled baler, where the operating implement may be a front harvesting attachment or another implement for processing the harvested crop such as a stalk or straw chopper.

BRIEF DESCRIPTION OF THE DRAWINGS

The embodiments of the invention are described in detail below with reference to the accompanying drawings wherein.

DESCRIPTION OF THE PREFERRED EMBODIMENT

Figure 1:
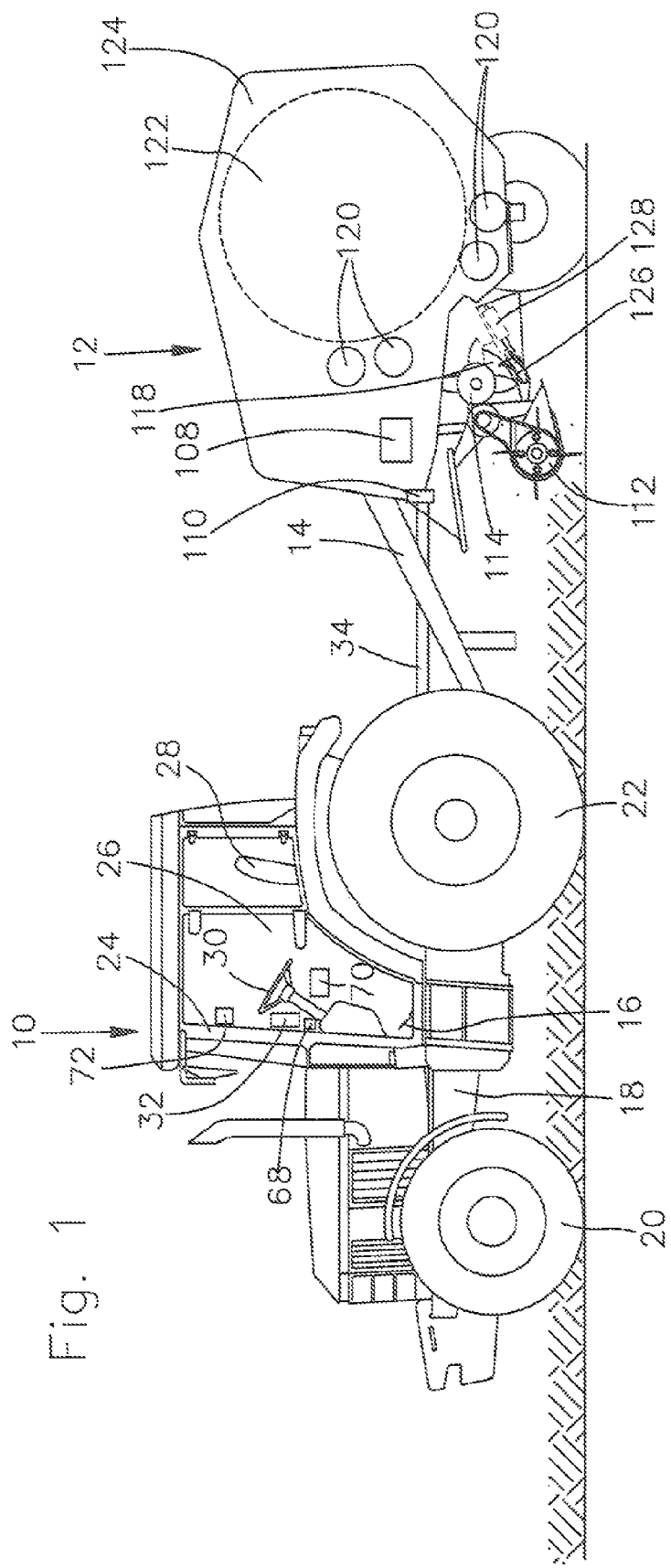
FIG. 1 is a side view of an agricultural vehicle in the form of a tractor with an operating implement coupled to it in the form of a round baler.

FIG. 1 shows a side view of an agricultural towing vehicle 10 in the form of a tractor and an operating implement coupled by means of a towbar 14 to an attachment coupling (not shown) of the towing vehicle 10. The operating implement is shown in the form of a round baler 12, known in itself, with a variable size baling chamber (see EP 0 316 506 A). The towing vehicle 10 is supported on a carrying frame 18 that is supported on steerable front wheels 20 and driven rear wheels 22 and carries a cab 24 which includes an operator's station 26.

The operator's station 26 includes a seat 28, a steering wheel 30, a gas pedal 16 and other pedals for brakes and clutch (not shown) and several input elements arranged within the reach of an operator located at the operator's station 26 for the input of functions of the operating implement 10 that can be selected. The latter is coupled to a selector arrangement 32 for the gear ratio of a power take-off shaft drive 46, a manual throttle lever 70, a power take-off shaft switch 68, and a virtual terminal 72 of a bus-system, operating according to ISO 11783, with a keyboard 90 and a display arrangement 94. The selector arrangement 32 and/or the power take-off shaft switch 68 may also be arranged as menu points on the terminal 72. In place of the terminal 72 any other desirable input and display arrangements may be used. The gas pedal 16 is equipped with a sensor that transmits electric signals to an operator interface logic 64 that contains information regarding the position of the gas pedal 16.

Figure 2:
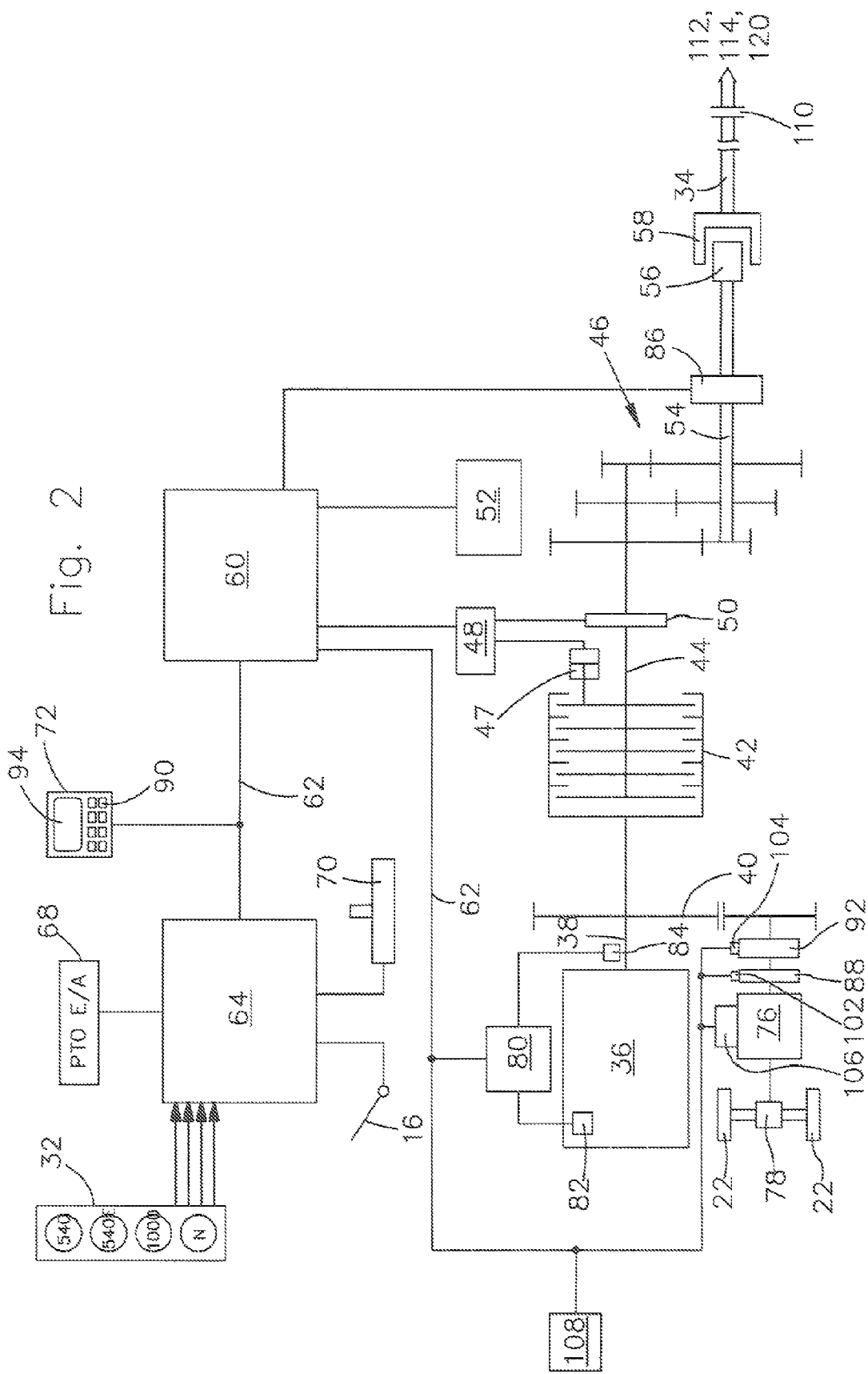
FIG. 2 is a schematic view of the drive arrangement of the operating implement; and, FIG. 3 is a program sequence according to which the control arrangement operates during the limitation of the torque of the power take-off shaft and during the limitation of the forward operating speed of the towing vehicle.

FIG. 2 schematically shows the drive arrangement of the towing vehicle 10 for the drive of the rear wheels 22 and a power take-off shaft 34, that is used for the drive of the driven elements of the operating implement 12. A drive engine 36, drives a shaft 38, that is used to drive the rear wheels 22 and preferably also the front wheels 20 over a gear 40, and if necessary, other driven arrangements of the towing vehicle 10, such as a compressor for an air conditioning system and an electric generator. The rear wheels 22 and, if necessary, the front wheels 20 are driven over a clutch 88 and a gear box with various selectable gear ratios or continuously, with a constant gear ratio and a differential gearbox 78.

In the configuration shown the drive arrangement includes a power shift gearbox 92, that contains a planetary gearset with clutches and brakes, that permit shifting gears under load, and a following synchronized shift gear box 78. The power shift gear box 92 and the synchronized shift gear box 78 are equipped in each case with an actuator 104 or 106 for the selection of the gear ratio. The drive line between the power shift gearbox 92 and the synchronized shift gearbox 76 further includes a clutch 88 that can be moved by a clutch actuator 102 between an engaged and a disengaged position. The shaft 38 is also connected with a power take-off shaft clutch 42, that is connected at its outlet side with an inlet shaft 44 of a power take-off shaft gearbox 46. The power take-off shaft clutch 42 is actuated by means of an actuator 47, that is controlled by a valve assembly 48, that is also connected with a brake 50 arranged on the input shaft 44.

The power take-off shaft gearbox 46 is provided with three different, selectable gear ratios and therefore includes three pairs of meshing gears. The gear ratio is selected by means of an electro-hydraulic (or electric) actuator 52, actuated by external forces, that establishes by means of sliding coupling elements, that are connected so as to transmit torque, which of the three gears arranged on an output shaft 54 of the power take of shaft gearbox 46 is connected with the output shaft 54, in a torque carrying connection. The actuator 52 permits the selection of the three gear ratios, of which in the present configuration a nominal first gear ratio of the drive engine 36 that is rotating at 2100 rpm permits a rotational speed of 1000 rpm of the output shaft 54, a second at a reduced rotational speed of the drive engine 36 at 1800 rpm that results in a rotational speed of the output shaft 54 of 540 rpm, and a third gear ratio that permits the drive engine 36 to rotate at 2100 rpm with a speed at an output shaft 54 of 540 rpm. In addition, there is the possibility of coupling none of the gears of the power take-off shaft gearbox 46 with the input shaft 44 or the output shaft 54, in order to bring the power take-off shaft gearbox 46 into neutral position, in which the output shaft 54 can rotate freely even when the brake 50 is applied. The output shaft 54 is connected to power take-off shaft output 56 in a form of a power take-off shaft stub shaft upon which the power take-off shaft 34 equipped with the hollow shaft end piece 58 can be slid onto the operating implement 12. The power take-off shaft 34 is usually configured as an articulated shaft.

An electronic control arrangement 60 is connected to the valve assembly 48 and to the actuator 52. In addition over an implement bus 62 (for instance CAN-Bus) it is connected with an operator interface logic 64, which for its part, is connected with the selector arrangement 32, the gas pedal 16 and the manual gas lever 70 and the power take-off shaft switch 68. The control arrangement 60 is also connected over the bus 62 and in addition with the virtual terminal 72, the actuators 104 and 106 and the clutch actuator 102 of the clutch 88. The selector arrangement 32 makes it possible for the operator to select by manual selection one of four keys selectively one of the three gear ratios of the power take-off shaft gear box 46 or the neutral position. The operator interface logic 64 transmits information regarding the input of the operator over the bus 62 to the control arrangement 60 that for its part, controls the actuator 52 corresponding to the information received.

If the operator brings the power take-off shaft switch 68 into the operating position, then the operator interface logic transmits a corresponding information to the control arrangement 60 over the bus 62, which for its part brings about the release of the brake 50 by the valve assembly 48 and engages the power take off clutch 42 by means of the actuator 47. If the operator brings the power take-off shaft switch 68 into the non-operating position, the operator interface logic 64 transmits analogously corresponding information over the bus 62 to the control arrangement 60, which, for its part, advises the valve assembly 48 to bring about the actuator 47 to disengage the power take-off shaft clutch 42 and to apply the brake 50.

Furthermore, the control arrangement 60 is connected with an engine control 80 over the bus 62, which in turn controls the injection system 82 of the engine 36, and which is supplied by a rotational speed sensor 84 with information about the immediate rotational speed of the shaft 38. A sensor 68 connected with the control arrangement 60 detects the torque transmitted by output shaft 54. The rotational speed sensor 84 can interact with the associated shaft 38 for example, optically (with coded disks interacting with the shaft 38 that interact with light barriers) or magnetically (by magnets connected to the shaft 38, that interact with induction coils, reed relays or hall sensors) or detect the rotational speed by any other desired means. The sensor 86 includes strain gauges arranged on the output shaft 54 that are connected by sliding contacts with the control arrangement 60, in order to detect the elastic torsion brought about by the transmitted torque in the output shaft 54. Any other desired configurations can be applied to the sensor 86, for example, laser sensors to detect the torsion of the output shaft 54. A measure of the torque can also be performed in such a way that a detection of the output rotational speed at the input and the output of the power take-off side clutch is detected by sensors (not shown), where the clutch slip can be detected by the rotational speeds existing ahead of and behind the power take-off shaft clutch 42, in that the clutch slip is adjusted and maintained at a constant value and where the torque transmitted by the power take-off shaft clutch 42 is detected.

On board the operating implement 12, the torque is transmitted from the power take-off shaft clutch 34 over an overload clutch 110, that may be any desired clutch, which disengages when a defined torque has been reached, for example, a sliding clutch or a cam controlled clutch and transmitted to the driven elements of the operating implements 12. Here it is for example a take up arrangement 112 for the harvested crop, a conveyor rotor 114 arranged in the intake channel 118 downstream of the take up arrangements 112, and rolls 120 that can be driven, that enclose a baling chamber 122. Furthermore, the operating implement 12 includes hydraulically driven actuators, such as hydraulic cylinders for opening a rear door 124, that is connected with the on board hydraulic system of the towing vehicle 10. A cutting arrangement equipped with knives 126 arranged along side each other and can be controlled by means of an actuator 128 in the form of a hydraulic cylinder that is connected over a valve (not shown) with the implement bus 62 to the on board hydraulic system of the towing vehicle 10 and can be pivoted into the intake channel 118 underneath the conveyor rotor 114 or pivoted out of the intake channel 118 (or moved in some other way, for example, shifted) that is controlled by the operator over the virtual terminal 72 and the implement bus 62. A storage arrangement 108 on board the operating implement 12 is connected with the implement bus 62.

Figure 3:
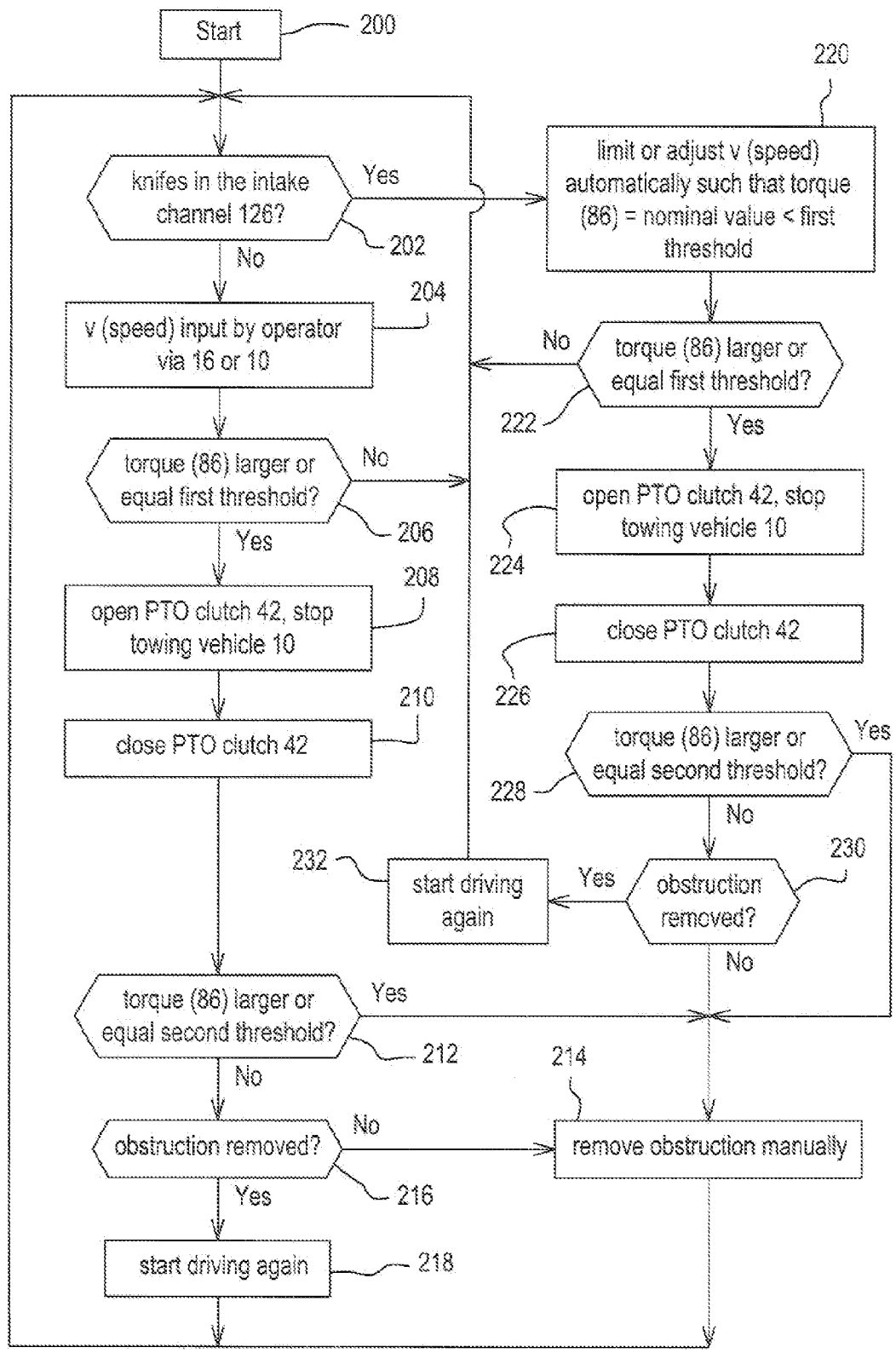

During the operation (harvest) the control arrangement 60 proceeds according to the flow diagram of FIG. 3.

After the start in step 200, step 202 questions whether the knives 126 are located in the intake channel 118. If that is not the case, step 204 follows, in which the control arrangement 60 advises the engine control 80 to let the drive engine 36 run at a rotational speed that corresponds to the actual input of the selector arrangement 32, that is depending on the particular key of the selector arrangement 32 that is depressed with a fixed rotational speed of 2100 rpm or 1800 rpm, while the gear ratio of the power take-off shaft drive gearbox 46 is set at a value appropriate for the operating implement 12. In the case of a preferred embodiment the rotational speed of the engine 36 and the gear ratio of the power take-off shaft gearbox 46 are adjusted automatically by the control arrangement 60 on the basis of data in the storage arrangement 108. Furthermore, in step 204 the forward operating speed of the towing vehicle 10 is provided as input by the operator by means of the gas pedal 16 or the manual throttle 70. The control arrangement 60 controls the actuators 104 and 106 and before and after the actuating of the actuator 106 of the clutch actuator 102 for disengaging and engaging the clutch 88, so that the drive arrangement drives the wheels 22 with the desired speed.

The torque measured by the sensor 86 on the output shaft 54 is compared in step 206 with a first threshold value. The first threshold value is smaller than the cut-off torque of the overload clutch 110. It can be provided as input by the operator as an absolute value or a percentage (for example 85%) of the cut-off torque of the overload clutch 110 provided as input by the operator over the virtual terminal 72 or recalled from the storage arrangement 108, where in the second case the cut-off torque of the overload clutch 110 can be retrieved from the storage arrangement 108. If the torque on the output shaft 54 and thereby at the power take-off shaft 34 is smaller than the first threshold value, a normal operation of the operating implement can be assumed and step 202 again follows.

On the other hand, it can be assumed that a jam exists at the take-up arrangement 112 or at the conveyor rotor 116 or a different malfunction exists on the operating implement 12. The control arrangement 60 thereby in step 208 brings about the actuator 47 that disengages the power take-off shaft clutch 42, in order to interrupt the drive of the driven elements of the operating implement 12. Furthermore the brake 50 may be applied. Furthermore, the towing vehicle 10 is also stopped, for example, by disengaging the clutch 88, and a parking brake of the towing vehicle 10 and if necessary, that of the operating implement 12 is also applied.

Step 210 then follows in which the control arrangement 60 automatically or upon an input by an operator orders the actuator 47 to again disengage the power take-off shaft clutch 42 over the virtual terminal 72, if necessary, after the brake 50 has again been released. The drive engine 36 continues to operate at the selected rotational speed. Accordingly, the attempt is made to remove the stoppage by means of a torque that is greater than the cut-off torque of the overload clutch 110.

In the following step 212 the control arrangement 60 compares the torque of the sensor 86 with a second threshold value that is greater than the cut-off torque of the overload clutch 110. This second threshold value may be provided as input of the capacity of the drive engine 36 and the power take-off shaft gearbox 46 and stored in memory in the control arrangement 60. Alternatively, it is provided by the operator as an absolute value or a multiple of the first threshold value or cut-off torque of the overload clutch 110 provided as input from the virtual terminal 72 or recalled from the memory arrangement 108. In case that in step 212 the torque at the output shaft 54 and hence at the power take-off shaft 34 is equal to or larger than the second threshold value, a malfunction continues to exist (possibly at the overload clutch 110 that does not disengage at the desired torque or at the sensor 86) so that then step 214 follows, in which the clutch 42 is again released and the brake 50 is applied. Accordingly, step 212 is used primarily to protect drive elements on board the towing vehicle 10. The operator must then leave his operator's station 26 and attempt to correct the malfunction. If this is successful, step 202 again follows.

In case that in step 212 the torque detected by the sensor 86 is lower than the second threshold value, step 216 follows in which the control arrangement 60 determines whether the malfunction has been corrected. In the case of a removal of the malfunction, it can be assumed, for example, if the torque at the sensor 86 is relatively high (in the vicinity of the cut-off torque of the overload clutch 110) and then reduced to a smaller value but that is larger than zero, since then it can be assumed that a jam existed at the take-up arrangement 112 or at the conveyor rotor 114, which at first led to an increase of the torque above the first threshold value and then after removal of the malfunction brought about the higher torque. In order to test whether the malfunction has actually been removed, an input from the operator can occur, for example in the virtual terminal 72 with which the removal of the malfunction is confirmed, or it can also be determined whether the output side of the overload clutch rotates. If, in step 216 the malfunction has not been removed, step 214 also follows, otherwise step 218, in which the control arrangement 60 brings about a renewed movement of the towing vehicle, in which the clutch actuator 102 engages the clutch 88 and successive gear ratios of the gear boxes 76 and 92 are used in order to accelerate the towing vehicle 10 and the operating implement 12 in a sufficiently gentle manner. Then step 202 again follows.

If on the other hand step 202 shows that the knives 126 are located in the intake channel 118, then step 220 follows. In this step 220 the forward operating direction of the towing vehicle 10 is provided as input by the operator either over a manual throttle control 70 or the gas pedal 16 and is limited in one way or another by the control arrangement 60, so that the torque detected by the sensor 86 is smaller or equal to a target value, or the forward operating velocity is controlled automatically by the control arrangement 60 in such a way that the torque detected by the sensor 86 is at least approximately equal to the target value. This target value is smaller than the first threshold value, it may be provided as input by the operator over the virtual terminal 72 and may be provided as absolute value or percentage (for instance 75%) of the cut-off torque of the overload clutch 110 or retrieved from the memory arrangement 108. Regarding the details of such a velocity control, in which the size of the just completed bale is also considered, reference is made to the disclosure of DE 10 2005 029 405 A1. Accordingly, the towing vehicle 10 is continuously driven at a forward operating speed, that results in a rate of take-up of the harvested crop resulting in a torque at the power take-off shaft 54 that is lower than the first threshold value. If larger amounts of harvested crop suddenly must be taken up, or the harvested crop must be conveyed with greater difficulty, for example, on the basis of higher moisture content, the control arrangement 60 can accept this overload without any problem and react without the overload clutch 110 reacting.

Accordingly, step 220 is followed by step 222, which corresponds to step 206, which in turn is followed by step 202, if the torque measured by the sensor 86 is lower than the first threshold value. On the other hand, step 224 follows, which corresponds to step 208, which in turn is followed by step 226 which corresponds to step 210, which in turn is again followed by the step 228 which corresponds to step 212. If the torque detected by the sensor 86 in step 228 is equal to or larger than the second threshold value, then step 214 also follows, while on the other hand step 230 follows, which corresponds to step 216. If step 230 shows that the obstruction has been removed, then step 232 follows, which corresponds to step 218, while otherwise step 214 follows.

After all that, the procedure of the control arrangement 72 may be summarized as follows, in normal operation the power take-off shaft clutch 42 is disengaged, if a torque is detected by the sensor 86 that is larger than the cut-off torque of the overload clutch 110. After a disconnect a larger torque is admitted to the power take-off shaft 34, in order to remove the trouble or the overload by means of the remaining torque reserve.

Having described the preferred embodiment, it will become apparent that various modifications can be made without departing from the scope of the invention as defined in the accompanying claims.

The invention claimed is:

1. A drive arrangement for driving an operating implement, the drive arrangement having:
a drive engine that is brought into driving connection over a separable power take-off shaft clutch with a power take-off shaft output;
a drive line of the operating implement connected to the power take-off shaft output, the drive line including an overload clutch that disengages the drive line if a cut-off torque is exceeded; and,
a control arrangement connected with and operated by a sensor at the power take-off shaft output, in order to induce an actuator to disengage the power take-off shaft clutch as soon as a torque detected by the sensor one of: reaches and exceeds a predetermined threshold value;
wherein the control arrangement utilizes a first threshold torque value that corresponds to a torque that is less than the cut-off torque of the overload clutch, and the control arrangement, after exceeding the first threshold torque value and a disengagement of the power take-off shaft clutch occasioned thereby, induces the actuator to engage the power take-off shaft clutch and when the power take-off shaft clutch is engaged permits a torque at the power take-off shaft output that is larger than the cut-off torque of the overload clutch.

2. The drive arrangement according to claim 1, wherein the control arrangement reconnects one of: automatically and upon an operator input the power take-off shaft clutch after the first threshold torque value had been exceeded.

3. The drive arrangement according to claim 1 wherein the control arrangement, after a first threshold torque value has been exceeded and a separation of the power take-off shaft clutch resulting therefrom, induces the actuator to engage the power take-off shaft clutch and then induces the actuator to disengage the power take-off shaft clutch as soon as the torque detected by the sensor one of: reaches and exceeds a second threshold torque value that corresponds to a torque that is larger than the cut-off torque of the overload clutch.

4. The drive arrangement according to claim 1, wherein the control arrangement permits a torque at the power take-off shaft after the first threshold torque value has been exceeded, one of: automatically and upon an input from an operator, where the torque is larger than the cut-off torque of the overload clutch.

5. The drive arrangement according to claim 1, wherein the control arrangement is provided with information concerning an operating condition of the operating implement and the control arrangement is operated to select the first threshold torque value as a function of the operating condition.

6. The drive arrangement according to claim 1, wherein the control arrangement is operated so as to one of: limit and provide as input a forward operating speed of a towing vehicle connected with the operating implement, so that the torque detected by the sensor does not one of: exceed or reach a value that is smaller than the first threshold torque value.

7. The drive arrangement according to claim 1, wherein at least one of: the first and the second threshold torque value can be one of: provided by the operator in an input arrangement and retrieved from a memory arrangement that is located on the operating implement.

8. The drive arrangement according to claim 1, wherein the control arrangement automatically stops a vehicle connected with the operating implement, when the torque detected by the sensor one of: reaches and exceeds the first threshold torque value.

9. A combination of a vehicle connected with an operating implement, the combination having a drive arrangement for driving the implement, the drive arrangement having:
a drive engine that is brought into driving connection over a separable power take-off shaft clutch with a power take-off shaft output;
a drive line of the operating implement connected to the power take-off shaft output, the drive line including an overload clutch that disengages the drive line if a cut-off torque is exceeded; and,
a control arrangement connected with and operated by a sensor at the power take-off shaft output induces an actuator to disengage the power take-off shaft clutch as soon as a torque detected by the sensor one of: reaches and exceeds a predetermined threshold torque value;
wherein the control arrangement utilizes a first threshold torque value that corresponds to a torque that is less than the cut-off torque of the overload clutch, and the control arrangement, after exceeding the first threshold value and a disengagement of the power take-off shaft clutch occasioned thereby, induces the actuator to engage the power take-off shaft clutch and when the power take-off shaft clutch is engaged permits a torque at the power take-off shaft output that is larger than the cut-off torque of the overload clutch.

10. The combination according to claim 9, wherein the control arrangement reconnects one of: automatically and upon an operator input the power take-off shaft clutch after the first threshold torque value has been exceeded.

11. The combination according to claim 9 wherein the control arrangement, after a first threshold value has been exceeded and a separation of the power take-off shaft clutch resulting therefrom, induces the actuator to engage the power take-off shaft clutch and then induces the actuator to disengage the power take-off shaft clutch as soon as a torque detected by the sensor one of: reaches and exceeds a second threshold torque value that corresponds to a torque that is larger than the cut-off torque of the overload clutch.

12. The combination according to claim 9, wherein the control arrangement permits a torque at the power take-off shaft after a first threshold torque value has been exceeded, one of: automatically or upon an input from an operator, where the torque is larger than the cut-off torque of the overload clutch.

13. The combination according to claim 9, wherein the control arrangement is provided with information concerning an operating condition of the operating implement and the control arrangement selects the first threshold torque value as a function of the operating condition.

14. The combination according to claim 9, wherein the control arrangement one of: limits and provides as input a forward operating speed of the vehicle connected with the operating implement, so that the torque detected by the sensor does not one of: exceed and reach a threshold torque value that is smaller than the first threshold torque value.

15. The combination according to claim 9, wherein at least one of the first and the second threshold torque value can be one of: provided by the operator in an input arrangement and retrieved from a memory arrangement that is located on the operating implement.

16. The combination according to claim 9, wherein the control arrangement automatically stops the vehicle connected with the operating implement, when the torque detected by the sensor one of: reaches and exceeds the first threshold value.

17. The combination according to claim 13, wherein the operating implement is a baler.

18. The combination according to claim 17, wherein the operating condition of the operating implement is a position of knives that can selectively be inserted into a conveying channel.

19. The combination according claim 18, wherein the control arrangement one of: limits and provides as input the forward operating speed only when the knives have been brought into the conveying channel, so that the torque detected by the sensor does not one of: reach and exceed a target value.

20. A method for driving an operating implement comprising the following steps:

operating a drive engine that is connected so as to drive, over a power take-off shaft clutch that can be disengaged, with a power take-off shaft output;

operating a drive line of the operating implement connected to the power take-off shaft output, that has an overload clutch, to disengage the drive line when a cut-off torque has been exceeded;

operating a control arrangement that is connected with a sensor detecting a torque at the power take-off shaft output, to induce an actuator to disengage the power take-off shaft clutch as soon as the torque detected by the sensor has one of: reached and exceeded a predetermined threshold value;

wherein the control arrangement uses a first threshold torque value that corresponds to a torque that is lower than the cut-off torque of the overload clutch, and the control arrangement after a first threshold value has been exceeded and the power take-off shaft clutch has been disengaged, instructs the actuator to engage the power take-off shaft clutch and permits a torque at the power take-off shaft output that is greater than the cut-off torque of the overload clutch when the power take-off shaft clutch is engaged.

* * * * *